(12) United States Patent
Griffin et al.

(10) Patent No.: US 11,420,248 B2
(45) Date of Patent: Aug. 23, 2022

(54) IMPACT-COMPENSATING BUCKING BAR

(71) Applicant: The Boeing Company, Chicago, IL (US)

(72) Inventors: Steven Griffin, Kihei, HI (US); Darby Grant Cooper, Madison, AL (US); Naval Kishore Agarwal, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 756 days.

(21) Appl. No.: 16/218,359

(22) Filed: Dec. 12, 2018

(65) Prior Publication Data

US 2020/0188986 A1 Jun. 18, 2020

(51) Int. Cl.
| | |
|---|---|
| *B21J 15/36* | (2006.01) |
| *B21J 15/40* | (2006.01) |
| *F16F 7/10* | (2006.01) |
| *F16F 7/104* | (2006.01) |
| *F16F 13/00* | (2006.01) |

(52) U.S. Cl.
CPC .............. *B21J 15/36* (2013.01); *B21J 15/40* (2013.01); *F16F 7/104* (2013.01); *F16F 7/1028* (2013.01); *F16F 13/005* (2013.01)

(58) Field of Classification Search
CPC .......... B21J 15/36; B21J 15/40; F16F 7/1028; F16F 7/104; F16F 13/005
See application file for complete search history.

(56) References Cited

U.S. PATENT DOCUMENTS

| | | | |
|---|---|---|---|
| 2,818,783 A | 1/1958 | Carson et al. | |
| 3,478,567 A * | 11/1969 | Galutia | B21J 15/36 |
| | | | 72/457 |
| 3,711,006 A * | 1/1973 | Conner | B21J 15/14 |
| | | | 227/61 |

(Continued)

FOREIGN PATENT DOCUMENTS

| | | |
|---|---|---|
| CN | 203217500 U | 9/2013 |
| CN | 104415524 A | 3/2015 |

(Continued)

OTHER PUBLICATIONS

Yocto-3D—USB Acceleration, tilt and orientation sensor, retrieved from the internet on Jul. 25, 2019, from http://www.yoctopuce.com/EN/products/usb-position-sensors/yocto-3d, 4 pages.

(Continued)

*Primary Examiner* — Ryan J. Walters
(74) *Attorney, Agent, or Firm* — Kolisch Hartwell, P.C.

(57) ABSTRACT

An impact-compensating bucking bar and its use to reduce impacts during riveting, where the bucking bar includes a body; a strike surface on a distal portion of the body, a compensating inertial mass coupled to the body by a flexible and resilient mass support, and a handgrip coupled to the body and configured for the user to urge the strike surface of the bucking bar against a tail of a rivet to facilitate upsetting the rivet tail during riveting. A relative movement of the compensating inertial mass of the bucking bar in response to a strike on the rivet head at least partially dissipates energy imparted to the body during riveting, reducing impact stresses on the bucking bar user.

20 Claims, 5 Drawing Sheets

(56) References Cited

U.S. PATENT DOCUMENTS

| | | | |
|---|---|---|---|
| 4,910,904 A | 3/1990 | Rose | |
| 5,572,900 A | 11/1996 | Ayeni | |
| 5,953,952 A | 9/1999 | Strickland | |
| 6,088,897 A | 7/2000 | Banks et al. | |
| 6,134,940 A | 10/2000 | Banks et al. | |
| 6,363,768 B1 | 4/2002 | Earls et al. | |
| 6,386,028 B2 | 5/2002 | Kolbe | |
| 7,669,356 B2 | 3/2010 | Joannes et al. | |
| 8,051,922 B2 * | 11/2011 | Ohlendorf | F16F 7/104 173/211 |
| 8,176,667 B2 | 5/2012 | Kamal et al. | |
| 8,353,121 B2 | 1/2013 | Clark et al. | |
| 8,418,391 B2 | 4/2013 | Kemmerer et al. | |
| 8,468,868 B1 | 6/2013 | Garrett, Jr. | |
| 8,668,496 B2 | 3/2014 | Nolen | |
| 8,733,006 B2 | 5/2014 | Williams et al. | |
| 8,887,430 B2 | 11/2014 | Wichner | |
| 9,126,094 B1 | 9/2015 | Davis | |
| 9,151,564 B1 | 10/2015 | Baxter | |
| 9,180,365 B2 | 11/2015 | Torre et al. | |
| 9,259,779 B2 | 2/2016 | Sarh et al. | |
| 9,440,284 B2 | 9/2016 | Sarh et al. | |
| 10,041,764 B2 | 8/2018 | Ooi | |
| 10,071,415 B1 | 9/2018 | Trenary | |
| 10,088,266 B1 | 10/2018 | Fournerat | |
| 11,150,047 B2 * | 10/2021 | Griffin | F16F 7/1011 |
| 2001/0015090 A1 | 8/2001 | Kolbe | |
| 2005/0188583 A1 | 9/2005 | Jackson et al. | |
| 2009/0253103 A1 | 10/2009 | Hogan, Jr. | |
| 2009/0277065 A1 | 11/2009 | Clark et al. | |
| 2009/0298590 A1 | 12/2009 | Marks et al. | |
| 2011/0126622 A1 | 6/2011 | Turner | |
| 2011/0162245 A1 | 7/2011 | Kamal et al. | |
| 2011/0207089 A1 | 8/2011 | Lagettie et al. | |
| 2011/0252684 A1 | 10/2011 | Ufer et al. | |
| 2012/0015332 A1 | 1/2012 | Stutz | |
| 2012/0297654 A1 | 11/2012 | Williams et al. | |
| 2013/0019510 A1 | 1/2013 | Kemmerer et al. | |
| 2013/0019512 A1 | 1/2013 | Kemmerer et al. | |
| 2013/0125441 A1 | 5/2013 | Westwood et al. | |
| 2013/0225288 A1 | 8/2013 | Levin et al. | |
| 2014/0028635 A1 | 1/2014 | Krah | |
| 2014/0190051 A1 | 7/2014 | Wichner | |
| 2014/0366419 A1 | 12/2014 | Allan | |
| 2015/0253109 A1 | 9/2015 | Wichner | |
| 2015/0369554 A1 | 12/2015 | Kramer | |
| 2016/0169627 A1 | 6/2016 | Northrup et al. | |
| 2017/0074618 A1 | 3/2017 | Wichner | |
| 2021/0025669 A1 | 1/2021 | Griffin | |

FOREIGN PATENT DOCUMENTS

| | | |
|---|---|---|
| DE | 19621700 C2 | 12/1997 |
| WO | 2008025973 A2 | 3/2008 |
| WO | 2014145079 A1 | 9/2014 |
| WO | 2016115554 A1 | 7/2016 |

OTHER PUBLICATIONS

U.S. Patent and Trademark Office, Non-Final Office Action regarding U.S. Appl. No. 16/522,595, dated Nov. 5, 2020, 16 pages.

McDowell et al., Laboratory and Workplace Assessments of Rivet Bucking Bar Vibration Emissions, Ann. Occup. Hyg., vol. 59, No. 3, 382-397, Nov. 7, 2014, 16 pages.

* cited by examiner

IMPACT-COMPENSATING BUCKING BAR

FIELD

This disclosure relates to bucking bars for use during riveting, and more specifically, the disclosed embodiments relate to impact-compensating bucking bars that reduce impact stresses on the bucking bar user.

INTRODUCTION

Rivets are fasteners used to create strong and permanent mechanical bonds. Before it is used, a rivet consists of a smooth cylindrical shaft with a head at one end. The end of the shaft opposite the head is called the tail. To install, a rivet is placed in a punched or drilled hole and the tail is deformed so that expands, thereby holding the rivet in place. Expanding the rivet tail is also known as upsetting, or bucking, the tail.

During riveting, the installer will place a rivet gun against the rivet head, and either they or another worker will hold a bucking bar against the tail of the rivet. The bucking bar is a specially-shaped solid block of metal. As the rivet gun delivers a series of impacts to the rivet head, the impact force in turn drives the tail of the rivet against the bucking bar, upsetting and hardening the tail of the rivet.

The bucking bar must of necessity be pressed firmly against the tail of the rivet, and so the impact forces of the rivet gun are transferred via the bucking bar to the operator's hand. This hand-transmitted vibration (or HTV) has been associated with the development of hand-arm vibration syndrome (HAVS). Studies have indicated that in some environments more than 50% of riveting tool operators may exhibit symptoms of HAVS, such as vibration white finger, carpal tunnel syndrome, or other hand and wrist musculoskeletal disorders.

SUMMARY

The present disclosure provides impact-compensating bucking bars and methods for reducing impact stresses on bucking bar users during riveting.

In some embodiments, the disclosure may provide a bucking bar that includes a body; a strike surface on a distal portion of the body that defines a plane that is substantially orthogonal to a strike axis of the body; a compensating inertial mass coupled to the body by a flexible and resilient mass support that permits the compensating inertial mass to translate in a direction parallel to the strike axis but substantially prevents movement of the compensating inertial mass in a direction orthogonal to the strike axis; and a handgrip that is coupled to the body and configured for a user to urge the strike surface of the bucking bar against a tail of a rivet to facilitate upsetting the rivet tail when a head of the rivet is struck. During riveting at least some of the energy imparted to the body by a strike on the rivet head while the strike surface is urged against the rivet tail is dissipated by a movement of the compensating inertial mass in a distal direction.

In some embodiments, the disclosure may provide a bucking bar that includes a body; a strike surface disposed on a distal portion of the body, where the strike surface defines a plane that is substantially orthogonal to a strike axis of the body; a handgrip, coupled to the body and configured for the user to urge the strike surface of the bucking bar against a tail of a rivet to facilitate upsetting the rivet tail when a head of the rivet is struck; a compensating inertial mass coupled to the body by a flexible and resilient mass support that includes one or more springs that permits translation of the compensating inertial mass parallel to the strike axis but substantially prevents movement of the compensating inertial mass in a direction orthogonal to the strike axis; a mass actuator configured to act upon the compensating inertial mass thereby urge the bucking bar body in a distal direction in reaction. The bucking bar further includes a strike detector configured to detect a strike of a rivet gun on the head of the rivet when the strike surface of the bucking bar is urged against the tail of the rivet and transmit a strike signal to a processor coupled to the strike detector, where the processor is configured to activate the mass actuator upon receiving the strike signal from the strike detector, and the movement of the bucking bar body in the distal direction in reaction is capable of at least partially dissipating energy imparted to the body by a rivet head strike.

In some embodiments, the disclosure may provide a method of reducing impact stresses on a bucking bar user during riveting, where the bucking bar being used includes a body, with a strike surface disposed on a distal portion of the body and that defines a plane that is substantially orthogonal to a strike axis of the bucking bar body; a handgrip, coupled to the bucking bar body and configured for the user to manipulate the bucking bar; and a compensating inertial mass, coupled to the bucking bar body by a flexible and resilient mass support that permits translation of the compensating inertial mass relative to the bucking bar body in a direction parallel to the strike axis but substantially prevents movement of the compensating inertial mass in a direction orthogonal to the strike axis. The method includes urging the strike surface of the bucking bar against a tail of a rivet to be upset; orienting the strike axis of the bucking bar substantially along a longitudinal axis of the rivet to be upset; and triggering an impact to a head of the rivet to upset the rivet tail against the strike surface. Triggering the impact to the head of the rivet results in a relative motion of the body in the distal direction along the strike axis that at least partially dissipates a transferred impact energy and reduces the impact stress on the user of the bucking bar.

The disclosed features, functions, and advantages of the disclosed bucking bars and methods may be achieved independently in various embodiments of the present disclosure, or may be combined in yet other embodiments, further details of which can be seen with reference to the following description and drawings.

DESCRIPTION

Various aspects and examples of impact-compensating bucking bars and methods for their use are described below and illustrated in the associated drawings. Unless otherwise specified, the disclosed apparatus and/or their various components may, but are not required to, contain one or more of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments will necessarily provide the same advantages or the same degree of advantages.

The illustrations of FIGS. 1-6 are semi-schematic in nature, and so do not necessarily accurately reflect the relative sizes and arrangement of components of the bucking bars of the present disclosure.

Figure 1:
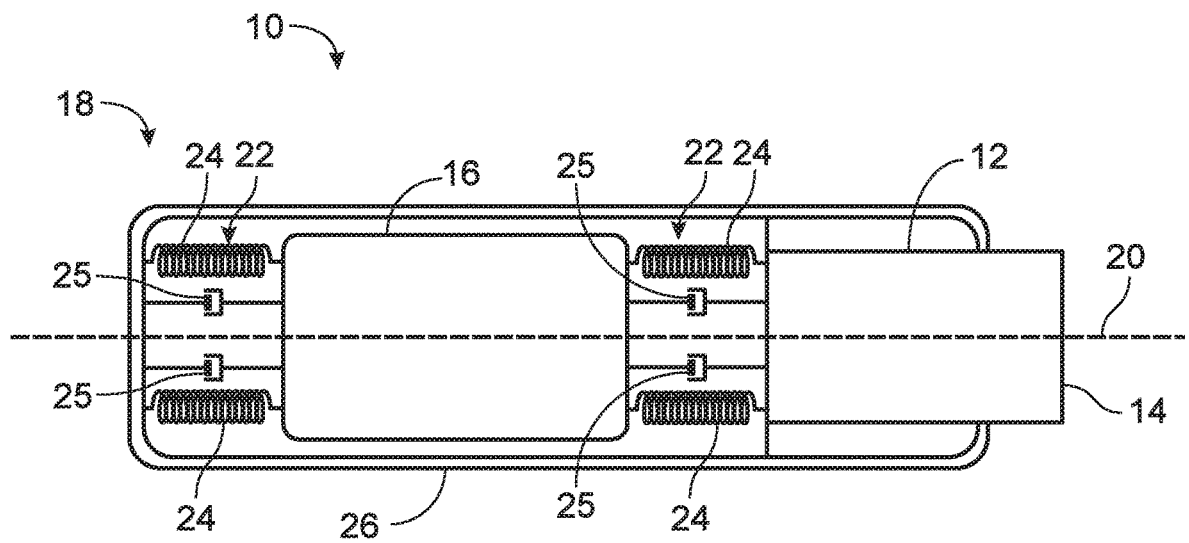
FIG. 1 semi-schematically depicts an impact-compensating bucking bar according to an illustrative aspect of the present disclosure.

FIG. 1 depicts an impact-compensating bucking bar 10 according to an aspect of the present disclosure. Bucking bar 10 includes a body 12 having a strike surface 14, a compensating inertial mass 16, and a handgrip 18.

Body 12 of bucking bar 10 is that component of the bucking bar that is principally employed when upsetting the tail of a rivet. Body 12 is traditionally a solid block of a relatively dense material. For example, body 12 can be composed of steel, or tungsten, among other materials. For the purposes of the present disclosure, however, body 12 can be composed of a durable and hard but relatively light (less dense) material, such as aluminum and aluminum alloys, magnesium and magnesium alloys, titanium and titanium alloys, and beryllium and beryllium alloys, among others. Alternatively, body 12 can be composed of a tough but light ceramic-based material.

The portion of body 12 that is used to contact the rivet tail to be upset is strike surface 14, which is disposed on a distal (forwardmost) portion of body 12. Strike surface 14 typically defines a plane that is substantially orthogonal to a strike axis 20 of body 12, where strike axis 20 corresponds to the axis along which impact forces due to striking the head of the rivet to be upset can be transmitted to bucking bar 10 via strike surface 14, as shown in FIG. 1.

Bucking bar 10 further includes a compensating inertial mass 16. Inertial mass 16 has a size and composition selected to provide the inertial mass with a large moment of inertia, particularly in comparison to the rest of bucking bar 10, and particularly in comparison to body 12. For this reason, inertial mass 16 is typically composed of a dense material, such as a heavy metal. For example, inertial mass 16 can be composed of one or more heavy metals including lead and lead alloys, tungsten and tungsten alloys, osmium and osmium alloys, uranium and uranium alloys, molybdenum and molybdenum alloys, iron and iron alloys, nickel and nickel alloys, copper and copper alloys, and zinc and zinc alloys, among others. While the size and shape of inertial mass 16 may vary according to the particular design of bucking bar 10, inertial mass 16 should not be made so large and heavy that a user of bucking bar 10 will find have difficulty supporting and using the bucking bar as described in the present disclosure. In one aspect of the present disclosure, inertial mass 16 has a mass of 0.3 to 1.3 kg. Alternatively, inertial mass 16 has a mass of 0.8 to 1.0 kg.

The compensating inertial mass 16 is coupled to body 12 by a flexible and resilient mass support 22. Mass support 22 is configured to permit translation of the compensating inertial mass 16 along or parallel to strike axis 20, but simultaneously substantially prevents movement of compensating inertial mass 16 in any direction orthogonal to strike axis 20. Mass support 22 is additionally configured to provide a damping effect on the translational motion of inertial mass 16 along strike axis 20. That is, mass support 22 incorporates one or more mechanisms for reducing and/or restricting the translational oscillations of inertial mass 16, typically by dissipating the energy of the oscillation by resisting the translational motion to as least some extent. Mass support 22 is configured to provide sufficient resilience to translational motion that inertial mass 16 is returned to its initial position after such motion.

The schematic representation of mass support 22 in FIGS. 1-4 depicts multiple coiled springs 24. In one aspect of the present disclosure, mass support 22 includes one or more springs 24 that provide a resistance to translation of compensating inertial mass 16 parallel to strike axis 20. Alternatively, or in addition, mass support 22 includes one or more damping mechanisms, or dampers 25. When present in addition to springs 24, dampers 25 can be disposed in parallel with springs 24, as shown in FIGS. 1-6.

As an alternative to springs 24, mass support 22 can include alternative resilient compressive supports and/or resilient elastic supports. Alternatively or in addition, mass support 22 can include pneumatic or hydraulic resistance media, such as fluids that resist a motion of inertial mass 16 when it is suspended in the fluid, or that must pass through restricted passages in inertial mass 16 as it moves. Mass support 22 may be configured to completely support inertial mass 16, or mass 16 may be, for example, slidably supported by one or more guide rods that are disposed along or parallel to strike axis 20, where the guide rod(s) serves to keep inertial mass 16 centered and to prevent motion orthogonal to strike axis 20. In one aspect of the present disclosure, mass support 22 is configured to permit translation of compensating inertial mass 16 substantially along strike axis 20.

Although mass support 22 can couple inertial mass 16 directly to body 12, mass support 22 typically couples inertial mass 16 to body 12 indirectly, for example via a housing 26 of bucking bar 10. That is, inertial mass 16 is coupled to housing 26, which in turn is coupled to body 12.

Housing 26 typically encloses the various components of bucking bar 10, and is configured to be both light and strong. Suitable materials for housing 26 should be both lightweight and rigid, so that they are efficient at transferring impulse forces but contribute relatively little to the mass, and therefore to the moment of inertia, of the combined body 12 and housing 26.

A portion of housing 26 can additionally be configured as a handgrip 18. Handgrip 18 is coupled directly or indirectly to body 12 and is configured to permit a user of bucking bar 10 to manipulate in order to urge strike surface 14 against the tail of the rivet to be upset. Handgrip 18 therefore facilitates the ability of the user to upset the tail of the rivet when the head of the rivet is struck. While handgrip 18 may correspond to or include a portion of housing 26, handgrip 18 can also include a discrete handgrip that is attached or applied to housing 26, particularly where a resilient or textured handgrip may prove more comfortable for the user of bucking bar 10, and/or further reduce transmitted shocks.

In order to upset the tail of a rivet, the user of bucking bar 10 urges strike surface 14 against the tail of the rivet to be upset. When the head of the rivet is struck, the impact force impulse is transmitted to bucking bar 10 via body 12, and the combined mass of body 12 and housing 26 is impelled slightly in the proximal direction (backwards), as depicted in FIG. 2 (scale of proximal movement is greatly exaggerated for the sake of the illustration).

As compensating inertial mass 16 has a mass that is at least substantially similar to the mass of the rest of bucking bar 10, inertial mass 16 therefore has a correspondingly large relative moment of inertia. As mass support 22 permits movement along strike axis 20, inertial mass 16 will not be displaced in the proximal direction to the same degree as the rest of bucking bar 10 by the impulse from the rivet strike. Therefore, with respect to the frame of reference of bucking bar 10, inertial mass 16 will move in a distal direction, and the deformation of mass support 22 in response to the relative motion will at least partially dissipate the energy imparted to body 12 by the strike on the rivet head.

In one aspect of the present disclosure, the mass of inertial mass 16 is at least substantially equivalent to the combined mass of the remaining components of bucking bar 10. Generally, the mass of inertial mass 16 is greater than the combined mass of the remaining components of bucking bar 10, and in particular, inertial mass 16 can have a mass that is approximately 1.5 times the combined mass of the remaining components of bucking bar 10. The overall mass of bucking bar 10 should not be made so large, however, that a user of the bucking bar would find it tiring or awkward to use for extended periods.

Figure 2:
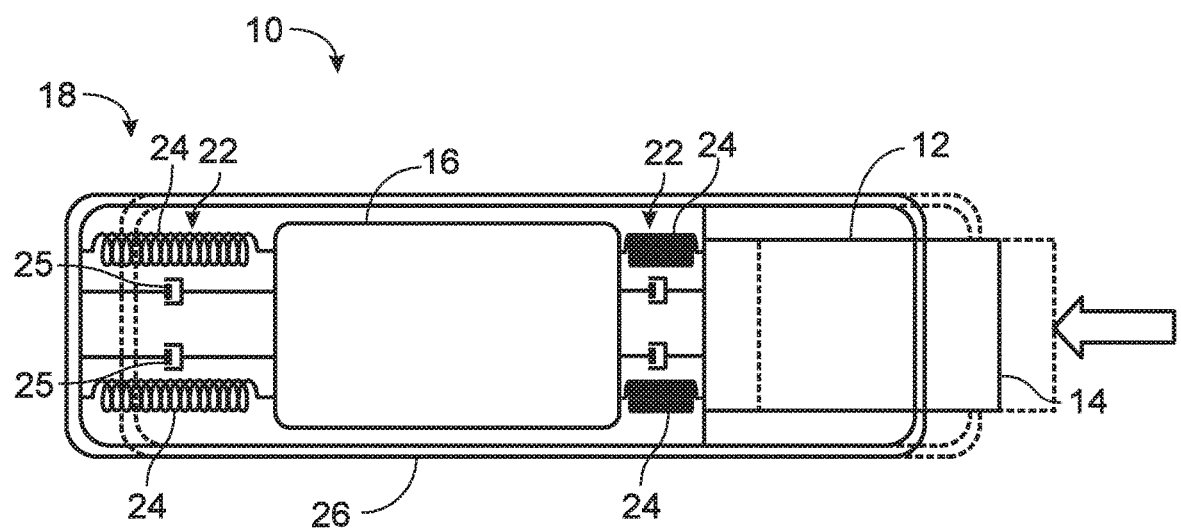
FIG. 2 depicts the bucking bar of FIG. 1 after it has received an impact on its strike surface.

Bucking bar 10 of FIGS. 1 and 2 therefore employs a passive reaction to receiving impact impulses that can at least partially absorb the forces transferred to body 12, and thereby in turn decrease vibrations transmitted to the user's hand during riveting. As the operation of bucking bar 10 is passive, it requires no additional electronics or power supply to provide this advantageous reduction in operator exposure to energetic impacts.

Figure 3:
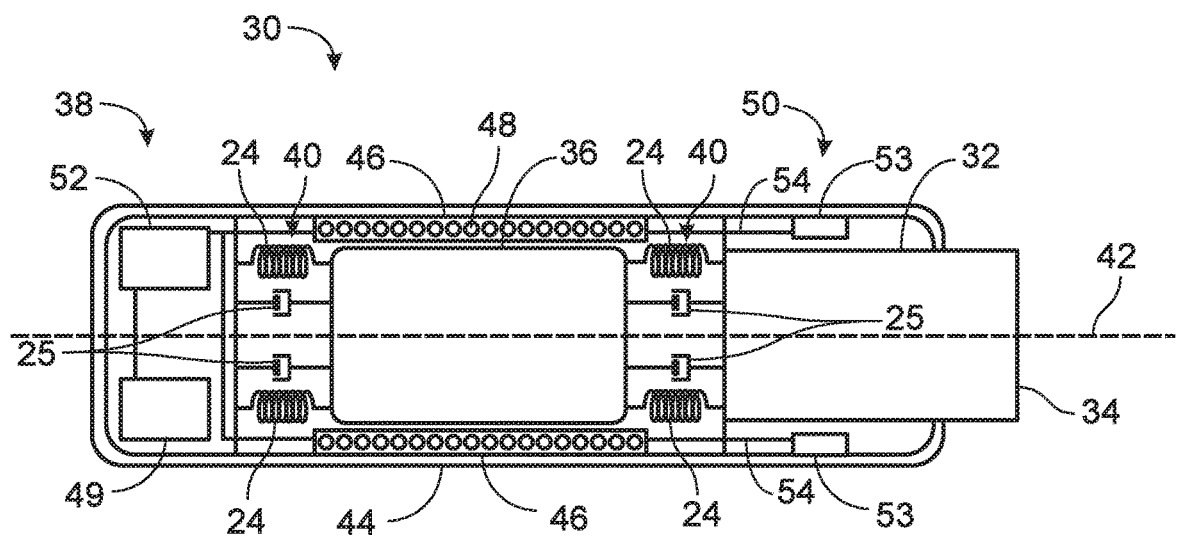
FIG. 3 semi-schematically depicts an alternative impact-compensating bucking bar according to an aspect of the present disclosure.
Figure 4:
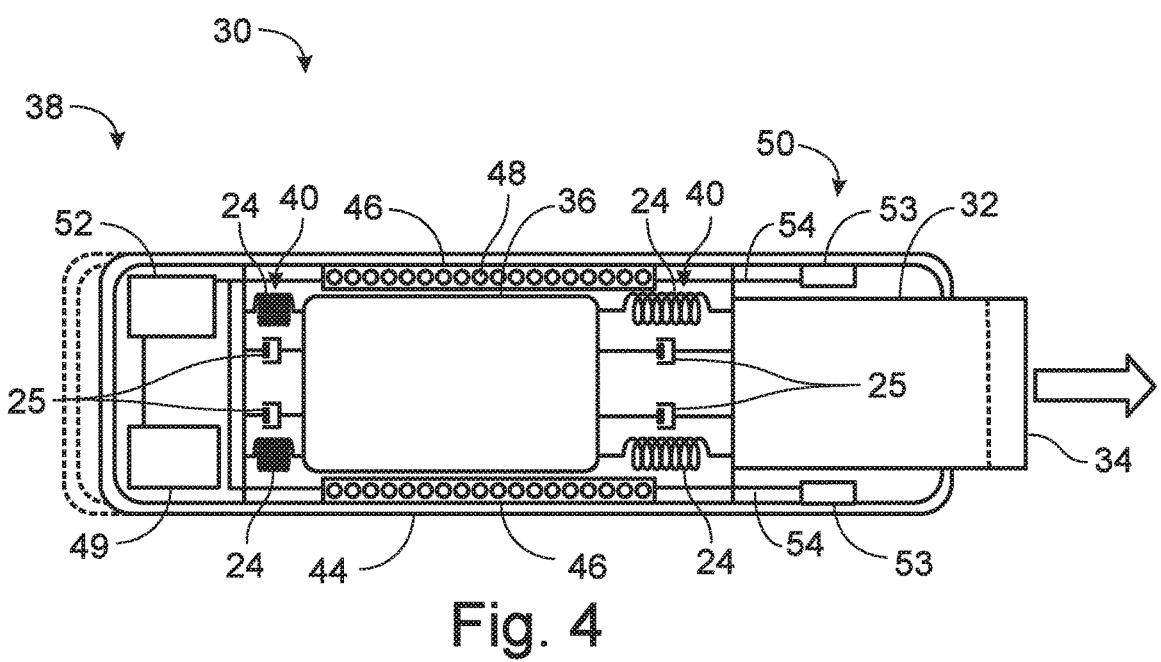
FIG. 4 depicts the bucking bar of FIG. 3 after activation of its mass actuator.

In an alternative embodiment of the present disclosure, bucking bar 30 shown in FIGS. 3 and 4 employs active compensation to decrease exposure to repetitive impact forces. Similarly to bucking bar 10, bucking bar 30 includes a body 32 having a strike surface 34, a compensating inertial mass 36, and a handgrip 38. Compensating inertial mass 36 is similarly support by a flexible and resilient mass support 40 that can include one or more springs and that permits translation of compensating inertial mass 36 relative to body 32 along an axis parallel to the strike axis 42 of bucking bar 30, but that substantially prevents movement of compensating inertial mass 36 in a direction orthogonal to the strike axis 42. Mass support 40 is directly or indirection coupled to a housing 44 of bucking bar 30.

In order to facilitate an active compensation process, bucking bar 30 further includes a mass actuator 46 that is coupled to body 32, for example via housing 44, and is configured to act upon compensating inertial mass 36 by applying a force on inertial mass 36 so as to urge it along strike axis 42. Inertial mass 36 can be urged initially in either the proximal direction (backwards) or the distal direction (towards strike surface 34). Typically, mass actuator 46 requires power input to act upon inertial mass 36, and so bucking bar 30 can include a power supply 49, which may include any suitable battery or, less preferably, a corded connection to an external power source.

Similar to bucking bar 10, the composition of inertial mass 36 is selected so that the mass and corresponding moment of inertia of inertial mass 36 is at least equal to that of the remaining components of bucking bar 30, so that the force applied by mass actuator 46 results in the remaining components of bucking bar 30 being urged in the proximal direction in reaction (as shown in FIG. 4). That is, instead of passively absorbing a portion of the incoming impact force, bucking bar 30 actively applies a counterforce along strike axis 42 in a direction opposed to the incoming impact force.

Any configuration of mass actuator that is capable of urging inertial mass 36 in the proximal direction is a suitable mass actuator for the purposes of this disclosure. In one aspect of the disclosed bucking bar, compensating inertial mass 36 of bucking bar 30 is composed of a ferromagnetic material, and bucking bar 30 further includes an electromagnetic mass actuator 46 that is configured to act upon ferromagnetic compensating inertial mass 36 by applying a force on inertial mass 36 so as to drive it in the proximal direction (backwards). Mass actuator 46 typically includes an electromagnetic coil 48 that surrounds ferromagnetic compensating inertial mass 36, so that passing a current through coil 48 of mass actuator 46 applies a force to inertial mass 36 in the proximal direction.

In order to most effectively counteract the impact forces, the opposing movement of bucking bar 30 should occur during a narrow time interval when the impact force from striking the rivet head is being imparted to bucking bar 30. In order to activate the mass actuator with an appropriate timing, bucking bar 30 can further include a strike detector 50 that is configured to detect an impact on the head of the rivet and/or strike surface 34 when strike surface 34 is urged against the tail of the rivet. Upon detecting such an impact, strike detector 50 is configured to transmit a strike signal to a processor 52 coupled to strike detector 50.

Processor 52, in turn, is configured to activate electromagnetic mass actuator 46 upon receiving the strike signal from strike detector 50, so that the movement of body 32 in the distal direction in reaction is capable of at least partially compensating for energy imparted to body 32 by the rivet head strike.

Any method that permits processor 52 to effectively detect an impact on the head of the rivet to be upset, and to subsequently activate electromagnetic mass actuator 46, is a suitable method for the purposes of this disclosure.

In one aspect of the present disclosure, bucking bar 30 is configured to pass a current through electromagnetic coil 48 of mass actuator 46 upon the detection of an impact on strike surface 34. In this aspect, strike detector 50 may include one or more sensors 53 coupled to processor 52, where the sensors 53 are sufficiently sensitive to detect a strike upon the head of the rivet to be upset. In an additional aspect of the disclosure, sensors 53 and processor 52 may be configured so that the force of the impact on strike surface 34 is at least partially quantified, such that processor 52 can apply a current to coil 48 of mass actuator 46 that is substantially proportional to the force of the impact on strike surface 34. As a result, bucking bar body 32 can be urged in the distal direction with an amount of compensation force that is proportional to the force of the detected impact.

Any type of sensor that can accurately detect and/or quantify the force applied to strike surface 34 may be an appropriate sensor for use with strike detector 50. In one aspect of the disclosure, sensor 53 may include one or more accelerometers. In another aspect, strike detector 50 includes one or more sensors 53 that are force transducers, where the force transducers are configured to detect a rivet head strike, and to send the strike signal to processor 52 upon detection of the rivet head strike. In this aspect of the disclosure, strike detector 50 can be configured to detect the force of a rivet head strike and transmit the detected force information to processor 52 with the strike signal, and processor 52 can be further configured to adjust the activation of mass actuator 46 to be at least substantially proportional to the detected force of the rivet head strike.

Figure 5:
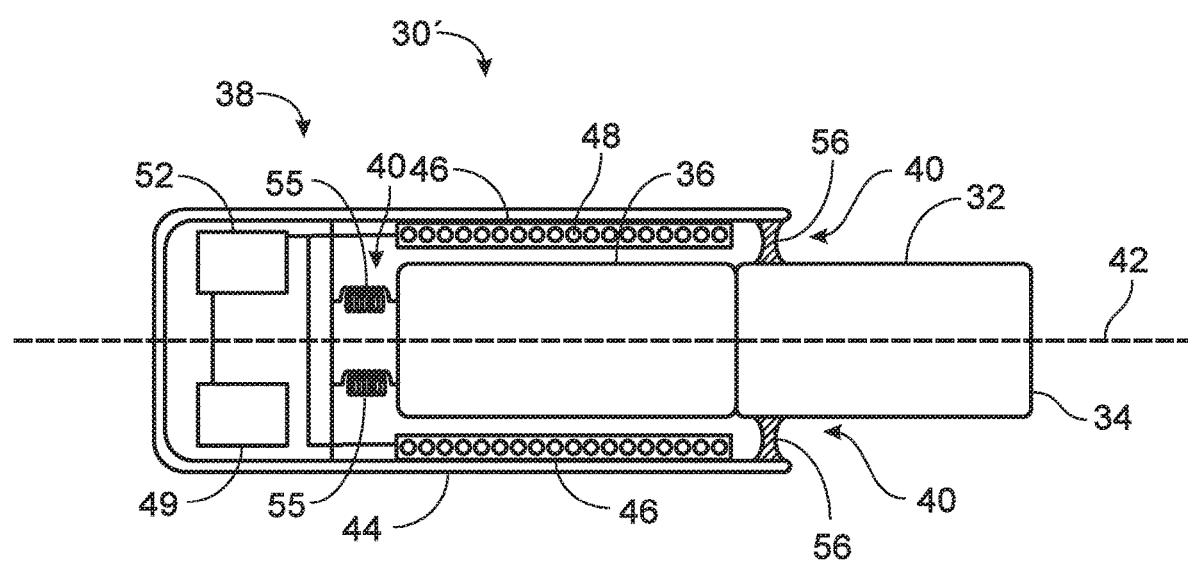
FIG. 5 semi-schematically depicts an alternative impact-compensating bucking bar according to an aspect of the present disclosure.

An alternative configuration of the disclosed impact-compensating bucking bar of the disclosure is shown in FIG. 5. Bucking bar 30' is similar to bucking bar 30 of FIGS. 3 and 4, excepting that inertial mass 36 is rigidly coupled to body 32 of bucking bar 30', while the combination of inertial mass 36 and body 32 is flexibly coupled to housing 44 by mass support 40. Mass support 40 can include, for example, springs 55 and flexible couplings 56, such that upon activation of mass actuator 46 the differential force exerted between housing 44 and inertial mass 36 results in a translation of inertial mass 36 and body 32 relative to housing 44. In this configuration, bucking bar 30' can be considered to function analogously to an active car suspension. Sensors 53 for bucking bar 30' are not shown in FIG. 5 for the sake of the clarity of the drawing.

In one aspect of the disclosure, as shown in FIGS. 3 and 4, the strike signal is transmitted from strike detector 50 to processor 52 via a direct connection 54, such as via electrical or fiber optic connection. In an alternative aspect of the disclosure, as shown in FIG. 6, the strike signal is transmitted from strike detector 50 to processor 52 via a wireless communication link.

By incorporating a wireless communication link, potential problems with signal latency may arise. That is, a delay may be created between detection of a strike at the rivet head and activation of the mass actuator due to one or more of encoding, transmission, reception, and decoding of the wireless signal, among other factors. Models have shown, however, that when the activation of the mass actuator lags behind the impulse arising from the rivet strike by not more than 20 degrees of the phase of the frequency of the incoming impulse, a significant amount of the impact force will nonetheless be attenuated, up to approximately 60% attenuation.

In practical terms the wireless communication of the strike signal to the processor preferably exhibits no more than 0.1 msec latency. The ITU IMT-2020 wireless communication standard (5G) approaches this requirement, and the L2WIRELESS industrial control system exceeds it. In general, any wireless technology that creates minimal latency during operation of the bucking bars of the present disclosure is an appropriate wireless technology for the disclosed bucking bars.

Figure 6:
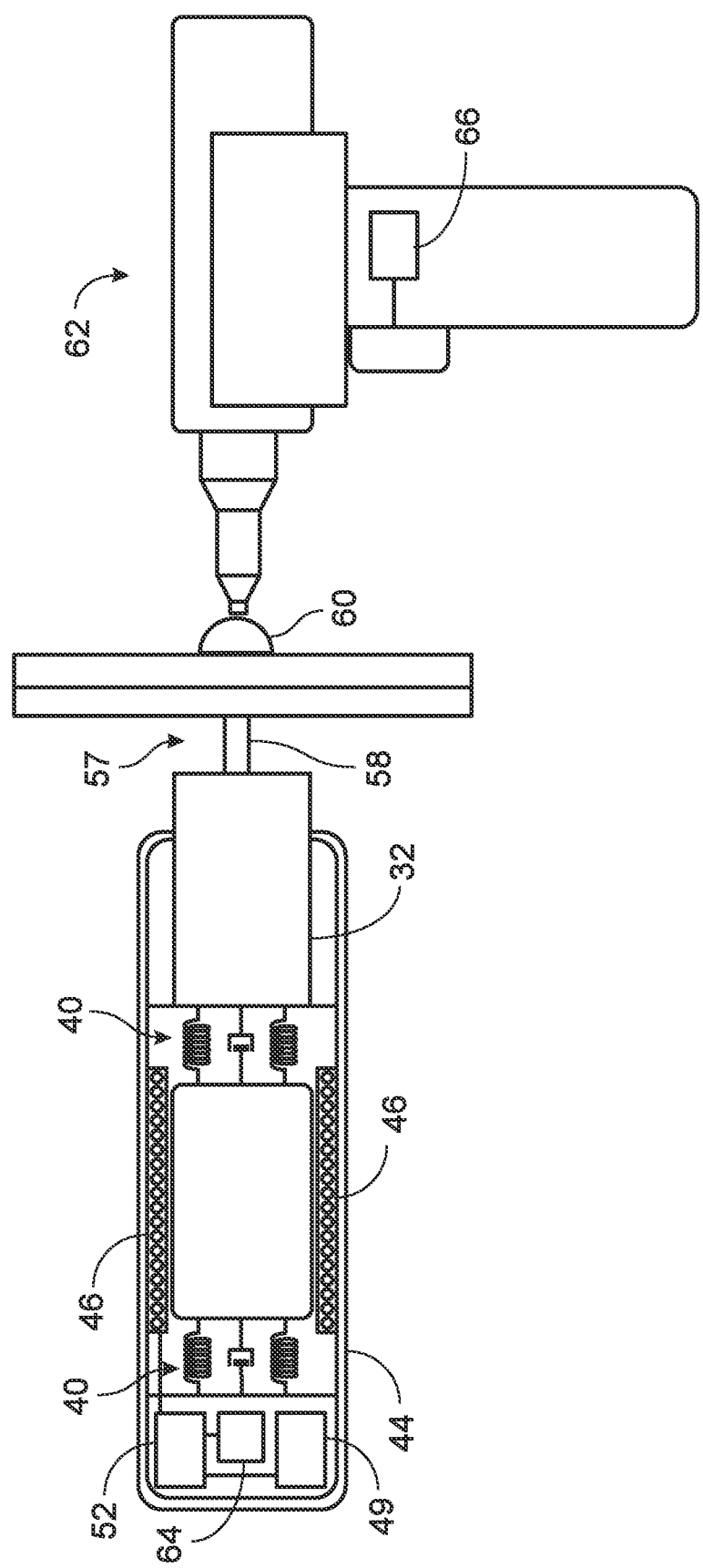
FIG. 6 semi-schematically depicts an alternative impact-compensating bucking according to an aspect of the present disclosure in conjunction with a rivet to be upset and a rivet gun

As depicted in FIG. 6, a bucking bar 30 is shown in conjunction with a rivet 57 having a tail 58 and a head 60, and an associated rivet gun 62, where associated rivet gun 62 is being used to strike head 60 of rivet 57. In this aspect of the disclosure, bucking bar 30 includes a strike detector 50 that in turn includes a receiver 64. A remote sensor 66 disposed on or in associated rivet gun 62 can be configured to detect the activation of associated rivet gun 62 and wirelessly transmit a strike signal to wireless receiver 64. For example, remote sensor 66 can be configured to function as a trigger sensor on associated rivet gun 62, so that when sensor 66 detects the triggering of associated rivet gun 62 a wireless signal is transmitted to receiver 64 and the strike signal is received by processor 52.

As noted above, in order to effectively counteract the effect of the impact on the bucking bar, the activation of mass actuator 46 should be timed to substantially correspond to the time interval during which the incoming impact energy is received. Where bucking bar 30 exhibits an actuation delay between processor 52 receiving a strike signal originating from trigger sensor 66 and the subsequent activation of mass actuator 46, the actuation delay may be taken into consideration by implementing a delay between the triggering of associated rivet gun 62 and the actual actuation of associated rivet gun 62 to deliver the strike to head 60 of rivet 57. In this aspect of the disclosure, associated rivet gun 62 is configured to delay the rivet head strike after the rivet gun is triggered by a delay interval that is selected to substantially correspond to the actuation delay of bucking bar 30.

Figure 7:
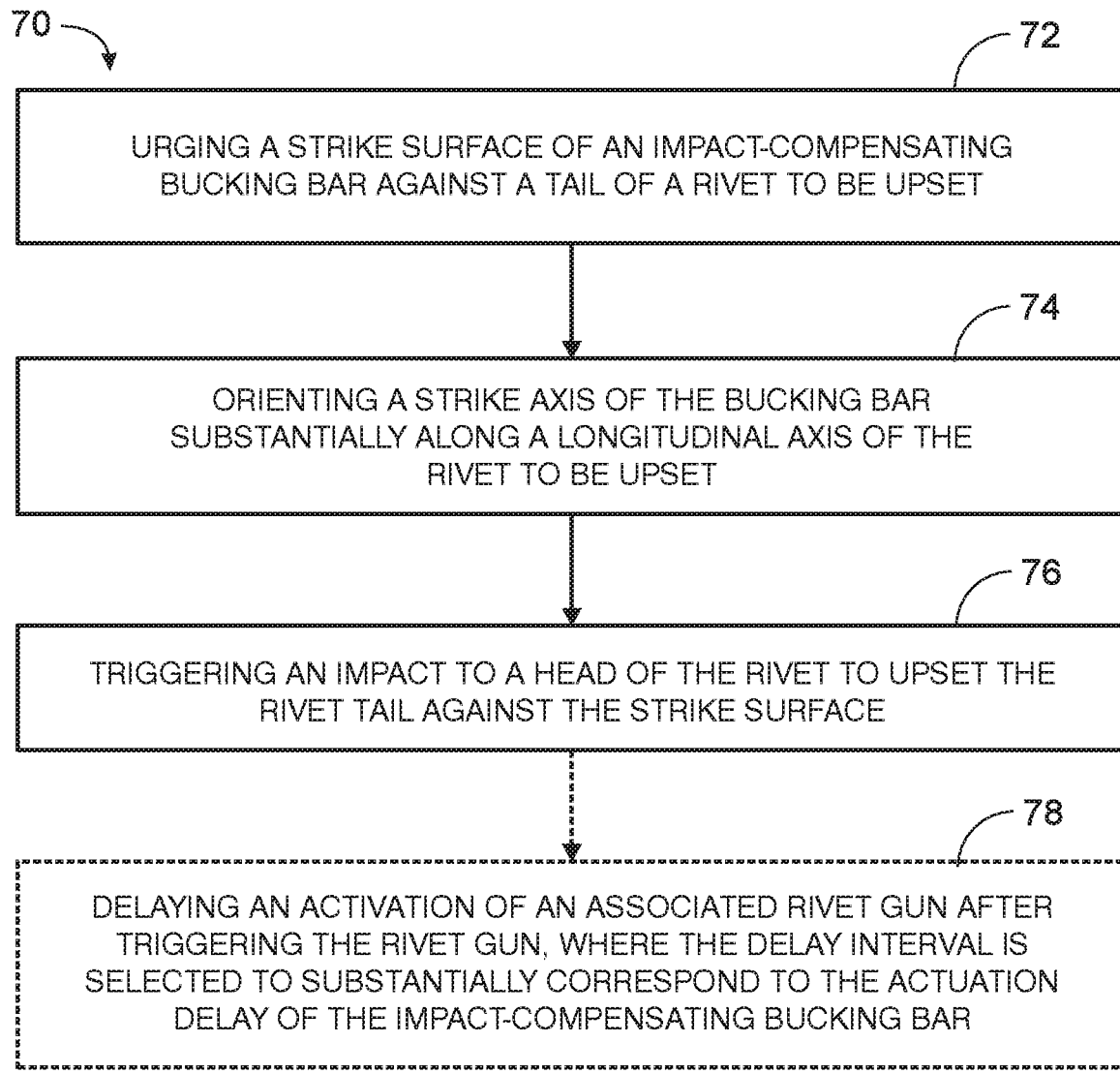
FIG. 7 is a flowchart for a representative method of reducing impact stresses on a bucking bar user during riveting according to an illustrative aspect of the present disclosure.

The impact-compensating bucking bars disclosed herein have particular utility for a method of reducing impact stresses on a bucking bar user during riveting, as set out in flowchart 70 of FIG. 7. The method includes urging a strike surface of an impact-compensating bucking bar against a tail of a rivet to be upset, at step 72 of flowchart 70, where the impact-compensating bucking bar includes: a body, where the strike surface is disposed on a distal portion of the body and defines a plane that is substantially orthogonal to a strike axis of the bucking bar body; a handgrip, coupled to the bucking bar body and configured for the user to manipulate the bucking bar; and a compensating inertial mass, coupled to the bucking bar body by a flexible and resilient mass support that permits translation of the compensating inertial mass relative to the bucking bar body in a direction parallel to the strike axis but substantially prevents movement of the compensating inertial mass in a direction orthogonal to the strike axis. The method further includes orienting the strike axis of the bucking bar substantially along a longitudinal axis of the rivet to be upset, at step 74 of flowchart 70, and triggering an impact to a head of the rivet to upset the rivet tail against the strike surface, at step 76 of flowchart 70, where triggering the impact to the head of the rivet results in a relative motion of the compensating inertial mass toward the strike surface and along the strike axis and thereby at least partially dissipates a transferred impact energy and reduces an impact stress on the user.

Triggering the impact to the head of the rivet during the recited method can include activating a strike detector that is configured to detect a strike on the rivet head, and the strike detector in turn activating a mass actuator that is configured to act upon the compensating inertial mass and impel the bucking bar body in a distal direction in reaction, in order to at least partially dissipate any transferred impact energy and reduce impact stresses on the user.

In another aspect of the disclosed method, triggering the impact to the head of the rivet includes activating a strike detector that is configured to detect a triggering of an associated rivet gun, and the strike detector in turn activating a mass actuator that is configured to act upon the compensating inertial mass and impel the bucking bar body in a distal direction in reaction to at least partially dissipate any transferred impact energy and reduce the impact stresses on the user.

The disclosed method can optionally further include delaying the activation of the associated rivet gun after triggering the associated rivet gun by a delay interval that is selected to substantially correspond to an actuation delay measured between detecting the triggering of the associated rivet gun and activation of the mass actuator, as shown at step 78 of flowchart 70.

EXAMPLES, COMPONENTS, AND ALTERNATIVES

The following numbered paragraphs describe selected aspects of the disclosed impact-compensating bucking bars and methods of reducing impact stresses using the impact-compensating bucking bars. The examples in these sections are intended for illustration and should not be interpreted as limiting the entire scope of the present disclosure. Each section may include one or more distinct embodiments or examples, and/or contextual or related information, function, and/or structure.

A1. A bucking bar, comprising:
a body;
a strike surface disposed on a distal portion of the body, the strike surface defining a plane that is substantially orthogonal to a strike axis of the body;
a compensating inertial mass coupled to the body by a flexible and resilient mass support that permits translation of the compensating inertial mass parallel to the strike axis but substantially prevents movement of the compensating inertial mass in a direction orthogonal to the strike axis; and
a handgrip, coupled to the body and configured for a user to therewith urge the strike surface of the bucking bar against a tail of a rivet to facilitate upsetting the rivet tail when a head of the rivet is struck;
wherein a movement of the compensating inertial mass in a distal direction at least partially dissipates energy imparted to the body by a strike on the rivet head while the strike surface is urged against the rivet tail.

A2. The bucking bar of paragraph A1, wherein the compensating inertial mass is 0.3 to 0.6 kg.

A3. The bucking bar of paragraph A1, wherein the mass support includes one or more springs that provide a resistance to translation of the compensating inertial mass parallel to the strike axis.

A4. The bucking bar of paragraph A1, wherein the motion of the compensating inertial mass decreases vibrations transmitted to the user's hand during riveting.

A5. The bucking bar of paragraph A1, wherein the mass support permits translation of the compensating inertial mass substantially along the strike axis.

B1. A bucking bar, comprising:
a body;
a strike surface disposed on a distal portion of the body, the strike surface defining a plane that is substantially orthogonal to a strike axis of the body;
a handgrip, coupled to the body and configured for a user to therewith urge the strike surface of the bucking bar against a tail of a rivet to facilitate upsetting the rivet tail when a head of the rivet is struck;
a compensating inertial mass coupled to the body by a flexible and resilient mass support that includes one or more springs to permit translation of the compensating inertial mass relative to the body along an axis parallel to the strike axis but substantially prevents movement of the compensating inertial mass in a direction orthogonal to the strike axis;
a mass actuator that is coupled to the body and configured to act upon the compensating inertial mass so as to urge the body in a distal direction in reaction; and
a strike detector that is configured to detect a strike of a rivet gun on the head of the rivet when the strike surface of the bucking bar is urged against the tail of the rivet and transmit a strike signal to a processor coupled to the strike detector;
wherein the processor is configured to activate the mass actuator upon receiving the strike signal from the strike detector, and the movement of the bucking bar body in the distal direction in reaction is capable of at least partially dissipating energy imparted to the body by a rivet head strike.

B2. The bucking bar of paragraph B1, wherein the strike detector is configured to detect an impact on the strike surface due to the rivet head strike, and the processor is configured to activate the mass actuator upon detecting the impact on the strike surface.

B3. The bucking bar of paragraph B2, wherein the strike detector includes a force transducer that is configured to detect the impact on the strike surface, and to send the strike signal to the processor upon detection of the impact on the strike surface.

B4. The bucking bar of paragraph B3, wherein the strike detector is further configured to detect a force of the impact on the strike surface, and to transmit the detected force information to the processor with the strike signal; and the processor is further configured to adjust the activation of the mass actuator to be at least proportional to the detected force of the impact on the strike surface.

B5. The bucking bar of paragraph B1, wherein the strike detector is configured to detect an activation of an associated rivet gun, and the processor is configured to activate the mass actuator upon detecting the activation of the associated rivet gun.

B6. The bucking bar of paragraph B5, wherein the strike detector includes a trigger sensor on the associated rivet gun that is configured to detect a triggering of the rivet gun and to send the strike signal to the processor upon detection of the triggering of the associated rivet gun.

B7. The bucking bar of paragraph B6, wherein the associated rivet gun is configured to delay the rivet head strike by a delay interval after the associated rivet gun is triggered that is selected to substantially correspond to an actuation delay between the processor receiving the strike signal from the trigger sensor and activation of the mass actuator by the processor.

B8. The bucking bar of paragraph B1, wherein the strike signal is transmitted from the strike detector to the processor via a wireless communication link.

B9. The bucking bar of paragraph B1 wherein the compensating inertial mass is ferromagnetic, the mass actuator is an electromagnetic coil surrounding the ferromagnetic compensating inertial mass, and the compensating inertial mass is acted upon by the mass actuator by passing a current through the electromagnetic coil.

B10. The bucking bar of paragraph B9, wherein the bucking bar is configured to pass the current through the electromagnetic coil of the mass actuator upon a detection of an impact on the strike surface, such that the current passed through the electromagnetic coil is proportional to a force of the impact on the strike surface, the bucking bar body is urged in the distal direction with a compensation force that is proportional to the force of the detected impact.

B11. The bucking bar of paragraph B1, wherein the mass actuator is coupled to the body by a resilient connection that is configured to dampen the motion of the mass actuator in response to its acting upon the compensating inertial mass.

C1. A method of reducing impact stresses on a bucking bar user during riveting, comprising:

urging a strike surface of an impact-compensating bucking bar against a tail of a rivet to be upset;
  wherein the impact-compensating bucking bar includes
    a body, where the strike surface is disposed on a distal portion of the body and defines a plane that is substantially orthogonal to a strike axis of the bucking bar body;
    a handgrip, coupled to the bucking bar body and configured for the user to manipulate the bucking bar;
    a compensating inertial mass, coupled to the bucking bar body by a flexible and resilient mass support that permits translation of the compensating inertial mass relative to the bucking bar body in a direction parallel to the strike axis but substantially prevents movement of the compensating inertial mass in a direction orthogonal to the strike axis;
  orienting the strike axis of the bucking bar substantially along a longitudinal axis of the rivet to be upset; and
  triggering an impact to a head of the rivet to upset the rivet tail against the strike surface;
  wherein triggering the impact to the head of the rivet results in a relative motion of the body in the distal direction along the strike axis and thereby at least partially dissipates a transferred impact energy and reduces an impact stress on the user.

C2. The method of paragraph C1, wherein triggering the impact to the head of the rivet comprises activating a strike detector that is configured to detect a strike on the rivet head and the strike detector in turn activates a mass actuator that is configured to act upon the compensating inertial mass and thereby impel the bucking bar body in a distal direction in reaction to at least partially dissipate any transferred impact energy and reduce impact stresses on the user.

C3. The method of paragraph C2, wherein triggering the impact to the head of the rivet comprises activating a strike detector that is configured to detect a triggering of an associated rivet gun and the strike detector in turn activates a mass actuator that is configured to act upon the compensating inertial mass and thereby impel the bucking bar body in a distal direction in reaction to at least partially dissipate any transferred impact energy and reduce the impact stresses on the user.

C4. The method of paragraph C3, further comprising delaying an activation of the associated rivet gun after triggering of the associated rivet gun by a delay interval that is selected to substantially correspond to an actuation delay measured between detecting the triggering of the associated rivet gun and activation of the mass actuator.

ADVANTAGES, FEATURES, BENEFITS

The different embodiments and examples of the apparatus and methods described herein provide several advantages over earlier bucking bar implementations. In particular, the use of either passive and/or active compensation of impact stresses can help prevent or improve repetitive stress injuries experienced by users.

Additionally, the same compensation capacity can reduce the sound created by either human-operated or automated riveting operations. The wear and tear on the associated equipment can similarly be reduced.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A bucking bar, comprising:
  a body;
  a strike surface disposed on a distal portion of the body, the strike surface defining a plane that is substantially orthogonal to a strike axis of the body;
  a handgrip, coupled to the body and configured for a user to therewith urge the strike surface of the bucking bar against a tail of a rivet to facilitate upsetting the rivet tail when a head of the rivet is struck;
  a compensating inertial mass coupled to the body by a flexible and resilient mass support that includes one or more springs to permit translation of the compensating inertial mass relative to the body along an axis parallel to the strike axis but substantially prevents movement of the compensating inertial mass in a direction orthogonal to the strike axis;
  a mass actuator that is coupled to the body and configured to act upon the compensating inertial mass so as to urge the body in a distal direction in reaction; and
  a strike detector that is configured to detect a strike of a rivet gun on the head of the rivet when the strike surface of the bucking bar is urged against the tail of the rivet and transmit a strike signal to a processor coupled to the strike detector;
  wherein the processor is configured to activate the mass actuator upon receiving the strike signal from the strike detector, and the movement of the bucking bar body in the distal direction in reaction is capable of at least partially dissipating energy imparted to the body by a rivet head strike.

2. The bucking bar of claim 1, wherein the strike detector is configured to detect an impact on the strike surface due to the rivet head strike, and the processor is configured to activate the mass actuator upon detecting the impact on the strike surface.

3. The bucking bar of claim 2, wherein the strike detector includes a force transducer that is configured to detect the impact on the strike surface, and to send the strike signal to the processor upon detection of the impact on the strike surface.

4. The bucking bar of claim 3, wherein the strike detector is further configured to detect a force of the impact on the strike surface, and to transmit the detected force information to the processor with the strike signal; and the processor is further configured to adjust the activation of the mass actuator to be at least proportional to the detected force of the impact on the strike surface.

5. The bucking bar of claim 1, wherein the strike detector is configured to detect an activation of an associated rivet gun, and the processor is configured to activate the mass actuator upon detecting the activation of the associated rivet gun.

6. The bucking bar of claim 5, wherein the strike detector includes a trigger sensor on the associated rivet gun that is configured to detect a triggering of the rivet gun and to send the strike signal to the processor upon detection of the triggering of the associated rivet gun.

7. The bucking bar of claim 6, wherein the associated rivet gun is configured to delay the rivet head strike by a delay interval after the associated rivet gun is triggered that is selected to substantially correspond to an actuation delay between the processor receiving the strike signal from the trigger sensor and activation of the mass actuator by the processor.

8. The bucking bar of claim 1, wherein the strike signal is transmitted from the strike detector to the processor via a wireless communication link.

9. The bucking bar of claim 1 wherein the compensating inertial mass is ferromagnetic, the mass actuator is an electromagnetic coil surrounding the ferromagnetic compensating inertial mass, and the compensating inertial mass is acted upon by the mass actuator by passing a current through the electromagnetic coil.

10. The bucking bar of claim 9, wherein the bucking bar is configured to pass the current through the electromagnetic coil of the mass actuator upon a detection of an impact on the strike surface, such that the current passed through the electromagnetic coil is proportional to a force of the impact on the strike surface, the bucking bar body is urged in the distal direction with a compensation force that is proportional to the force of the detected impact.

11. The bucking bar of claim 1, wherein the mass actuator is coupled to the body by a resilient connection that is configured to dampen a motion of the mass actuator in response to its acting upon the compensating inertial mass.

12. The bucking bar of claim 1, wherein the compensating inertial mass is 0.3 to 0.6 kg.

13. The bucking bar of claim 1, wherein the one or more springs of the mass support provide a resistance to translation of the compensating inertial mass parallel to the strike axis.

14. The bucking bar of claim 1, wherein a motion of the compensating inertial mass decreases vibrations transmitted to the user's hand during riveting.

15. The bucking bar of claim 1, wherein the mass support permits translation of the compensating inertial mass substantially along the strike axis.

16. The bucking bar of claim 1, further comprising a power supply, the power supply configured to provide a power input to the mass actuator to act upon the compensating inertial mass.

17. A method of reducing impact stresses on a bucking bar user during riveting, comprising:
  urging a strike surface of an impact-compensating bucking bar against a tail of a rivet to be upset;
    wherein the impact-compensating bucking bar includes
      a body, where the strike surface is disposed on a distal portion of the body and defines a plane that is substantially orthogonal to a strike axis of the bucking bar body;
      a handgrip, coupled to the bucking bar body and configured for the user to manipulate the bucking bar;
      a compensating inertial mass, coupled to the bucking bar body by a flexible and resilient mass support, including one or more springs, that permits translation of the compensating inertial mass relative to the bucking bar body in a direction parallel to the strike axis but substantially prevents movement of the compensating inertial mass in a direction orthogonal to the strike axis;
  orienting the strike axis of the bucking bar substantially along a longitudinal axis of the rivet to be upset; and
  triggering an impact to a head of the rivet to upset the rivet tail against the strike surface;
    wherein triggering the impact to the head of the rivet comprises activating a strike detector that is configured to detect a strike on the rivet head and transmit a strike signal to a processor coupled to the strike detector, and the processor upon receiving the strike signal from the strike detector in turn activating a mass actuator that is configured to act upon the compensating inertial mass and thereby impelling the bucking bar body in a distal direction in reaction to at least partially dissipate any transferred impact energy and reduce impact stresses on the user.

18. The method of claim 17, wherein triggering the impact to the head of the rivet comprises activating a strike detector that is configured to detect a triggering of an associated rivet gun and the strike detector in turn activates a mass actuator that is configured to act upon the compensating inertial mass and thereby impel the bucking bar body in a distal direction in reaction to at least partially dissipate any transferred impact energy and reduce the impact stresses on the user.

19. The method of claim 18, further comprising delaying an activation of the associated rivet gun after triggering of the associated rivet gun by a delay interval that is selected to substantially correspond to an actuation delay measured between detecting the triggering of the associated rivet gun and activation of the mass actuator.

20. A bucking bar, comprising:
  a body;
  a strike surface disposed on a distal portion of the body, the strike surface defining a plane that is substantially orthogonal to a strike axis of the body;
  a handgrip, coupled to the body and configured for a user to therewith urge the strike surface of the bucking bar against a tail of a rivet to facilitate upsetting the rivet tail when a head of the rivet is struck;
  a compensating inertial mass rigidly coupled to the body and the combination of compensating inertial mass and the body flexibly coupled to a housing by a flexible and resilient mass support that includes one or more springs to permit translation of the combination of compensating inertial mass and the body relative to the housing along an axis parallel to the strike axis but substantially prevents movement of the combination of the compensating inertial mass and the body in a direction orthogonal to the strike axis;
  a mass actuator that is coupled to the housing and configured to act upon the compensating inertial mass so as to urge the combination of the compensating inertial mass and body in a distal direction in reaction; and
  a strike detector that is configured to detect a strike of a rivet gun on the head of the rivet when the strike surface of the bucking bar is urged against the tail of the rivet and transmit a strike signal to a processor coupled to the strike detector;
  wherein the processor is configured to activate the mass actuator upon receiving the strike signal from the strike detector, and the movement of the bucking bar body in the distal direction in reaction is capable of at least partially dissipating energy imparted to the body by a rivet head strike.

\* \* \* \* \*